United States Patent
Pattison et al.

(10) Patent No.: US 9,456,186 B2
(45) Date of Patent: *Sep. 27, 2016

(54) CHANNEL TUNING REDIRECT

(71) Applicant: EchoStar Technologies L.L.C., Englewood, CO (US)

(72) Inventors: Terry Pattison, Englewood, CO (US); Dan Minnick, Englewood, CO (US); Scott Fillingim, Englewood, CO (US); Mike Cavanaugh, Englewood, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/723,200

(22) Filed: May 27, 2015

(65) Prior Publication Data

US 2015/0264323 A1    Sep. 17, 2015

Related U.S. Application Data

(63) Continuation of application No. 13/675,858, filed on Nov. 13, 2012, now Pat. No. 9,071,799.

(60) Provisional application No. 61/600,403, filed on Feb. 17, 2012.

(51) Int. Cl.
*G06F 3/00* (2006.01)
*G06F 13/00* (2006.01)
(Continued)

(52) U.S. Cl.
CPC .................. *H04N 7/20* (2013.01); *H04N 5/50* (2013.01); *H04N 21/431* (2013.01); *H04N 21/4383* (2013.01); *H04N 21/44209* (2013.01); *H04N 21/472* (2013.01); *H04N 21/6143* (2013.01)

(58) Field of Classification Search
None
See application file for complete search history.

(56) References Cited

U.S. PATENT DOCUMENTS 5,461,427 A    10/1995    Duffield et al.
5,555,097 A    9/1996    Joung et al.
(Continued)

FOREIGN PATENT DOCUMENTS

WO    0201879 A2    1/2002
WO    2009/035466    3/2009

OTHER PUBLICATIONS

"Guidelines on Implementation and Usage of Service Information (SI)", Digital Video Broadcasting (DVB), Oct. 3, 2003, Geneva, Switzerland, 53 pages.

(Continued)

*Primary Examiner* — Nathan Flynn
*Assistant Examiner* — William J Kim
(74) *Attorney, Agent, or Firm* — Kilpatrick Townsend & Stockton LLP

(57) ABSTRACT

Various arrangements for presenting an electronic programming guide are detailed. An indication of a first television channel for tuning may be received by a television receiver. The first television channel may be transmitted as part of a first transponder stream. Based on an inadequate downlink signal being received for the first television channel, it may be determined that the first television channel cannot be received and output. A plurality of unavailable television channels may be identified due to the plurality of unavailable television channels being transmitted as part of the first transponder stream. An electronic programming guide may be output to a display device that indicates the plurality of unavailable television channels and the first television channel are each unavailable.

20 Claims, 9 Drawing Sheets

(51) Int. Cl.
*H04N 5/445* (2011.01)
*H04N 7/20* (2006.01)
*H04N 5/50* (2006.01)
*H04N 21/438* (2011.01)
*H04N 21/442* (2011.01)
*H04N 21/61* (2011.01)
*H04N 21/431* (2011.01)
*H04N 21/472* (2011.01)

(56) References Cited

U.S. PATENT DOCUMENTS

| | | | |
|---|---|---|---|
| 5,600,366 A | 2/1997 | Schulman | |
| 5,642,153 A * | 6/1997 | Chaney | H04N 5/4401 348/731 |
| 5,870,032 A | 2/1999 | Eslambolchi | |
| 6,108,044 A | 8/2000 | Shin | |
| 6,115,074 A | 9/2000 | Ozkan et al. | |
| 6,249,320 B1 | 6/2001 | Schneidewend et al. | |
| 6,335,762 B1 | 1/2002 | Lee | |
| 6,634,027 B1 * | 10/2003 | Johnson | H04B 7/18523 348/E7.049 |
| 6,741,293 B1 | 5/2004 | Obuchi | |
| 6,980,529 B1 | 12/2005 | Arsenault | |
| 7,061,542 B1 | 6/2006 | Ikeguchi | |
| 7,113,230 B1 | 9/2006 | Genovese et al. | |
| 7,130,576 B1 * | 10/2006 | Gurantz | H04H 40/90 455/3.01 |
| 7,370,343 B1 * | 5/2008 | Ellis | H04N 5/44543 348/E5.105 |
| 7,697,070 B1 | 4/2010 | Dugan et al. | |
| 7,742,104 B2 | 6/2010 | Kim | |
| 8,584,173 B2 | 11/2013 | Moran et al. | |
| 9,071,799 B2 | 6/2015 | Pattison et al. | |
| 2001/0036198 A1 | 11/2001 | Arsenault et al. | |
| 2002/0066102 A1 | 5/2002 | Chapman et al. | |
| 2004/0049796 A1 | 3/2004 | Briggs | |
| 2006/0038923 A1 | 2/2006 | Dinwiddie | |
| 2006/0117360 A1 | 6/2006 | Cooper et al. | |
| 2006/0171390 A1 | 8/2006 | La Joie | |
| 2006/0274208 A1 * | 12/2006 | Pedlow, Jr. | H04N 21/235 348/572 |
| 2008/0301749 A1 | 12/2008 | Harrar et al. | |
| 2008/0313671 A1 | 12/2008 | Batrouny et al. | |
| 2009/0150958 A1 | 6/2009 | Jerding et al. | |
| 2010/0162292 A1 | 6/2010 | Potrebic et al. | |
| 2010/0205633 A1 | 8/2010 | Kataoka et al. | |
| 2010/0253785 A1 | 10/2010 | Kummer et al. | |
| 2010/0325652 A1 | 12/2010 | Lee et al. | |
| 2011/0007218 A1 | 1/2011 | Moran et al. | |
| 2011/0030010 A1 | 2/2011 | Overbaugh | |
| 2011/0102683 A1 | 5/2011 | Josephs | |
| 2011/0126247 A1 | 5/2011 | Howarter et al. | |
| 2011/0131619 A1 | 6/2011 | Hasek et al. | |
| 2011/0296475 A1 | 12/2011 | Craner | |
| 2012/0072952 A1 | 3/2012 | Vaysman et al. | |
| 2012/0222074 A1 | 8/2012 | Mix et al. | |

OTHER PUBLICATIONS

"Linking HDTV Events to SDTV Services — Proposal for the extension of DVB specifications and guidelines", Digital Video Broadcasting (DVB), May 19, 2008, Geneva Switzerland, 7 pages.
Burzi, G. et al., "GBS0619r3—Proposed Modifications to Event_Likage Descriptor", Mar. 16, 2009, Geneva, Switzerland, 3 pages.
Vlot, Marnix, "Discussion Paper Dynamic HD Simulcast Linkage", DVB/GBS0601, Digital Video Broadcasting (DVB), Aug. 26, 2008, 9 pages.
International Search Report and Written Opinion of the International Searching Authority for International Application No. PCT/US2010/041334, mailed on Oct. 1, 2010, 9 pages.

* cited by examiner

CHANNEL TUNING REDIRECT

CROSS REFERENCE

This application is a continuation of U.S. application Ser. No. 13/675,858, filed Nov. 13, 2012, entitled "Channel Tuning Redirect," which claims priority to U.S. Provisional Application No. 61/600,403, filed Feb. 17, 2012, entitled "Channel Tuning Redirect." The applications are hereby incorporated by reference for all purposes.

BACKGROUND

Occasionally, whether due to equipment failure (e.g., a satellite malfunction), weather, atmospheric conditions, or some other occurrence, a first television channel may not be able to be accessed by television channel receiving equipment (e.g., receiving equipment, set top box (STB), or satellite tuner). However, in many cases, an available second channel may be presenting the same content as the unavailable first channel. For example, the second channel may be a standard-definition television channel presenting the same content as the high-definition first television channel. If a subscriber is not accustomed to tuning to the second channel, the subscriber may assume that the content of the first television channel is not currently available. This may result in upset subscribers contacting a television service provider. In such instances, the solution until the first television channel is fixed may be informing the subscribers of how to tune to the second television channel.

Such an arrangement may be inconvenient for the subscribers (they may need to call the television service provider) and/or the television service provider (it may need to field a large number of calls if the outage of the first television channel is widespread). Such a potentially inefficient arrangement may result in excessive costs to the television service provider and/or frustration of the television service provider's subscribers.

SUMMARY

Various arrangements for television channel tuning are presented. In some embodiments, a method for television channel tuning is presented. The method may include receiving, by receiving equipment, an indication of a first television channel for tuning. The method may include determining, by the receiving equipment, the first television channel is not available. The method may include identifying, by the receiving equipment, a second television channel that carries the same content as the first television channel. The second television channel may be available for tuning. The method may include tuning, by the receiving equipment, to the second television channel.

Embodiments of such a method may include one or more of the following: Identifying the second television channel that carries the same content as the first television channel may include: performing, by the receiving equipment, a lookup in a locally-stored database of the first television channel, determining, by the receiving equipment, a variable linked with the first television channel; and identifying, by the receiving equipment, the second television channel using the variable, wherein the second television channel is linked with the variable. The method may include updating, by the receiving equipment, the locally-stored database using data receiving via a satellite transmission. The method may include receiving, by the receiving equipment, from a computer system, via the Internet, an indication of one or more television channels currently unavailable via satellite. Receiving the indication may not occur via a satellite dish communicatively coupled with the receiving equipment. Tuning, by the receiving equipment, to the second television channel may occur without requiring input from a user. The first television channel and the second television channel may be in different display formats. The first television channel may be a high-definition television channel. The second television channel may be a standard-definition television channel. The first television channel may be transmitted from a different location than the second television channel. The first television channel may be transmitted from a first transponder of a television satellite and the second television channel may be transmitted from a second transponder of the television satellite. Determining the first television channel is not available for tuning may include determining that a sufficient signal cannot be received from a television satellite. The method may include outputting, by the receiving equipment, an indicator to be presented via a television that indicates the second television channel is being presented in place of the first television channel. The method may include, following tuning to the second television channel, monitoring, by the receiving equipment, the first television channel to determine if the first television channel has become available.

In some embodiments, a system is presented. A system for television channel tuning may be presented. The system may include a satellite dish configured to receive television signals from a plurality of transponders of a plurality of satellites. The system may include receiving equipment, communicatively coupled with the satellite dish. The receiving equipment may include a processor; and a memory communicatively coupled with and readable by the processor and having stored therein processor-readable instructions. The processor-readable instructions which, when executed by the processor, may cause the processor to receive an indication of a first television channel for tuning. The processor-readable instructions which, when executed by the processor, may cause the processor to determine the first television channel is not available. The processor-readable instructions which, when executed by the processor, may cause the processor to identify a second television channel that carries the same content as the first television channel. The second television channel may be available for tuning. The processor-readable instructions which, when executed by the processor, may cause the processor to tune to the second television channel.

Such a system may include one or more of the following: The receiving equipment may include a digital video recorder (DVR) and the indication of the first channel for tuning is received from the digital video recorder. The memory of the receiving equipment may store a database comprising information about each television channel available using the receiving equipment. The processor-readable instructions, when executed by the processor, further cause the processor to perform a lookup in a locally-stored database of the first television channel. The processor-readable instructions which, when executed by the processor, may cause the processor to determine a variable linked with the first television channel. The processor-readable instructions which, when executed by the processor, may cause the processor to identify the second television channel using the variable, wherein the second television channel is linked with the variable. The first television channel and the second television channel may be in different display formats. The first television channel may be a high-definition television channel. The second television channel may be a standard-definition television channel. The first television channel may be transmitted from a different television satellite than the second television channel. The first television channel may be transmitted from a first transponder of a television satellite and the second television channel may be transmitted from a second transponder of the television satellite.

In some embodiments, a computer program product residing on a non-transitory processor-readable medium for television channel tuning may be presented. The computer program product may include processor-readable instructions configured to cause a processor to receive an indication of a first television channel for tuning. The computer program product may include processor-readable instructions configured to cause the processor to determine the first television channel is not available. The computer program product may include processor-readable instructions configured to cause the processor to perform a lookup in a locally-stored database of the first television channel. The locally-stored database may indicate a satellite and a transponder for a plurality of channels. The computer program product may include processor-readable instructions configured to cause the processor to determine a variable linked with the first television channel. The computer program product may include processor-readable instructions configured to cause the processor to determine the second television channel using the variable. The second television channel may be linked with the variable. The second television channel may be available for tuning. The computer program product may include processor-readable instructions configured to cause the processor to tune to the second television channel.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
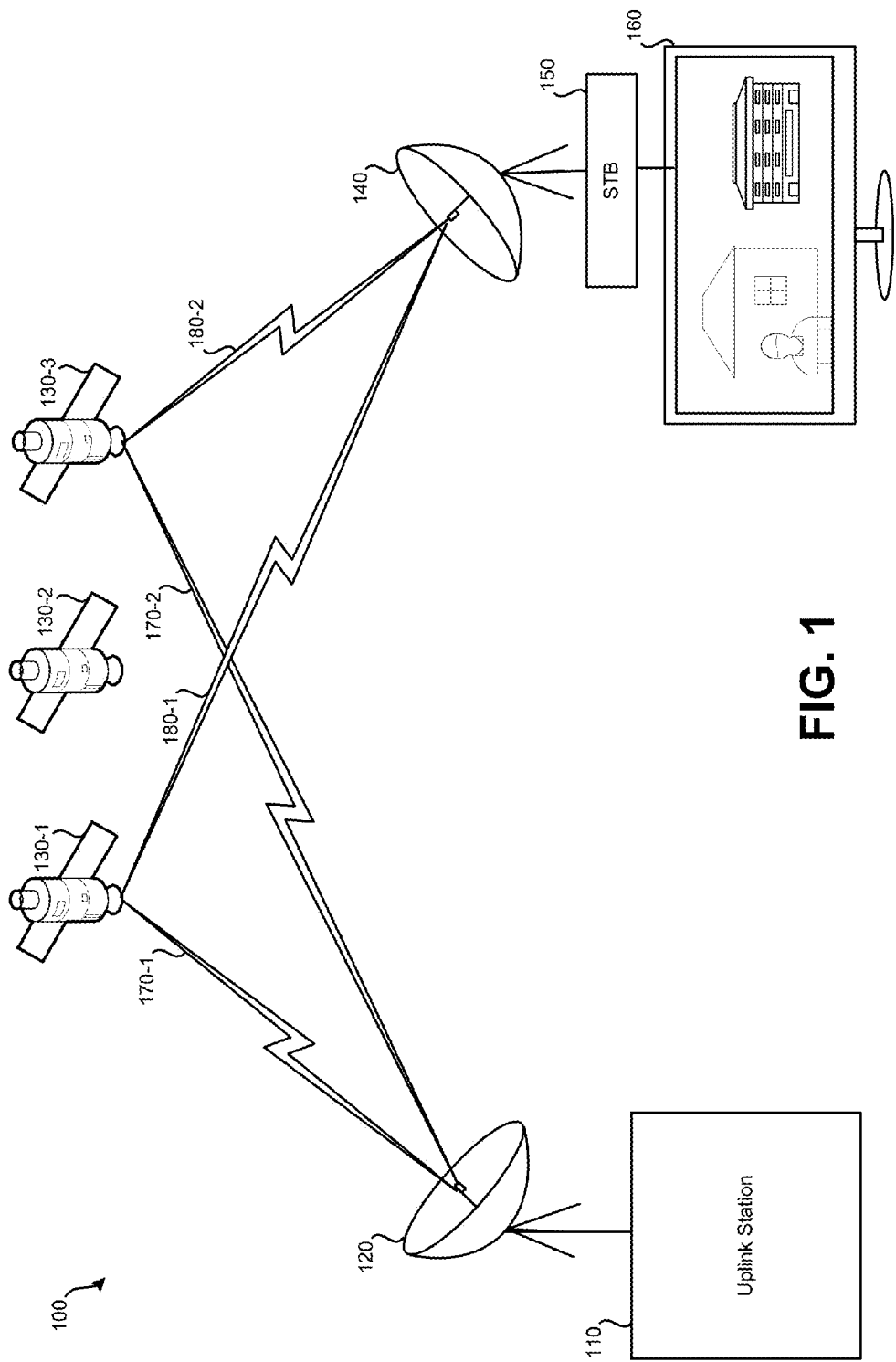
FIG. 1 illustrates an embodiment of a satellite television system.

When a first television channel is unavailable, whether due to equipment failure (e.g., a satellite malfunction), weather, signal loss (e.g., due to atmospheric conditions), or some other occurrence, rather than a subscriber either calling the television service provider or having to manually identify a second television channel that is available and presenting the same content as the unavailable first channel, receiving equipment may be configured to redirect to a second television channel presenting the same content as the first television channel. For example, if a high-definition first television channel is unavailable, the receiving equipment device may tune to a second television channel that is transmitting the same content in standard definition. As such, if the user attempts to tune to the first television channel (e.g., by inputting the first television channel's number), the receiving equipment device may determine that the first television channel is unavailable and may tune to the second television channel without any further input being required from the user.

For receiving equipment to select a second television channel to tune to in place of an unavailable first television channel, a locally-stored database, possibly in the form of a table, may be accessed. Such a database may be referred to as a service information database (SID) and may contain information about each television channel available via the receiving equipment. Within the SID may be a data field or variable (e.g., a flag) that indicates whether two (or more) television channels are considered to carry the same content. While each television channel may be associated with a different frequency, channel number, satellite, and/or transponder, a variable may be present within the SID that indicates the two television channels are considered equivalent for content. Data to populate the SID may be received as part of a network information table (NIT) that is transmitted periodically to the receiving equipment.

As an example, a high-definition television channel and a standard-definition version of the same television channel may be considered to have the same content. As such, if the high-definition channel is not available, the receiving equipment may use to the locally-stored SID to identify the standard-definition channel that carries the same content. This may still be possible if the standard-definition version of the channel is not displayed in an EPG to users of the receiving equipment. (For example, standard-definition television channels may not be displayed within an EPG when an equivalent high-definition channel is available to simplify display of the EPG to users.)

An electronic programming guide (EPG), which displays a schedule of programs appearing on multiple television channels, may be updated to reflect television channels that are unavailable. For example, if a signal for a particular television channel cannot be adequately received, the channel may be indicated as unavailable in the EPG or removed from display within the EPG to users. If a user attempts to tune to a channel indicated in the EPG as unavailable, a second television channel that is presenting the same (or similar) content may be tuned to instead. Based on the transponder and/or satellite on which the first channel is located, it may be assumed that other channels that use the same transponder and/or satellite are unavailable. As such, if a particular television channel is unavailable, it may be assumed that other channels that use the same or similar frequency, satellite, and/or transponder of the same satellite are also unavailable; the EPG may be updated as such.

In some embodiments, a second communication channel, besides a satellite link, between receiving equipment and a television service provider may be present. For example, the receiving equipment may be able to communicate with the television service provider using an Internet connection, such as via a household wireless network. Such a communication channel may allow unavailable television channels to be reported to the television service provider and/or information about unavailable television channels to be obtained by the receiving equipment from the television service provider. As such, the EPG of the receiving equipment may be updated to reflect currently unavailable television channels using information from the television service provider. Such a communication channel may also allow the television service provider to learn of a geographic region having difficulty receiving one or more television channels.

It should be understood that while the embodiments detailed herein disclose the reception and decoding of television channels, channels received and decoded by receiving equipment may contain data related to content other than television programming.

FIG. 1 illustrates an embodiment of a satellite television system 100. Satellite television system 100 may include: uplink station 110, satellite uplink 120, satellites 130, satellite dish 140, set-top box 150, and television 160. Alternate embodiments of satellite television system 100 may include fewer or greater numbers of components. While only one satellite dish 140, set-top box 150, and television 160 (collectively referred to as "user equipment") are illustrated, it should be understood that multiple (tens, thousands, millions) instances of user equipment may receive television signals from satellites 130.

Uplink station 110 and satellite uplink 120 may be operated by a television service provider. Uplink station 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites. Satellite uplink 120 may be used to transmit a feed of one or more television channels from uplink station 110 to one or more satellites 130. While a single uplink station 110 and a single satellite uplink 120 are illustrated as part of satellite television system 100, it should be understood that multiple uplink stations and/or multiple satellite uplinks may be present, possibly scattered geographically. Such multiple uplink stations and/or multiple satellite uplinks may communicate with the same or with different satellites. Different television channels may be transmitted to satellites 130 from different uplink stations and/or satellite uplinks.

Satellites 130 may be configured to receive signals, such as feeds of television channels, from one or more satellite uplinks such as satellite uplink 120. Satellites 130 may relay received signals from satellite uplink 120 (and/or other satellite uplinks) to multiple instances of user equipment, possibly being operated by subscribers to the television service provider. Satellites 130 may be geosynchronous orbit. Each satellite 130 may be in a different orbit, such that the signal path between each satellite, uplink stations, and user equipment vary. Multiple satellites 130 may be used to relay television channels from uplink station 110 to satellite dish 140. Different television channels may be carried using different satellites. Different television channels may also be carried using different transponders of the same satellite; thus, such television channels may be transmitted at different frequencies. As an example, a high-definition television channel may be carried by satellite 130-1. A standard-definition television channel that carries the same content as the high-definition television channel may be carried using a different satellite or a different transponder on the same satellite operating at a different frequency. If a television channel is transmitted from a different location than another television channel, the television channels may be transmitted from different transponders of the same satellite or from different transponders.

Satellite dish 140 may be a piece of user equipment that is used to receive signals from one or more satellites, such as satellites 130. Satellite dish 140 may be provided to a user for use on a subscription basis to receive television channels provided by the television service provider operating uplink station 110, satellite uplink 120, and/or satellites 130. Satellite dish 140 may be configured to receive signals from multiple satellites and/or multiple transponders of the same satellite. Satellite dish 140 may be configured to receive television channels on multiple frequencies.

Figure 4:
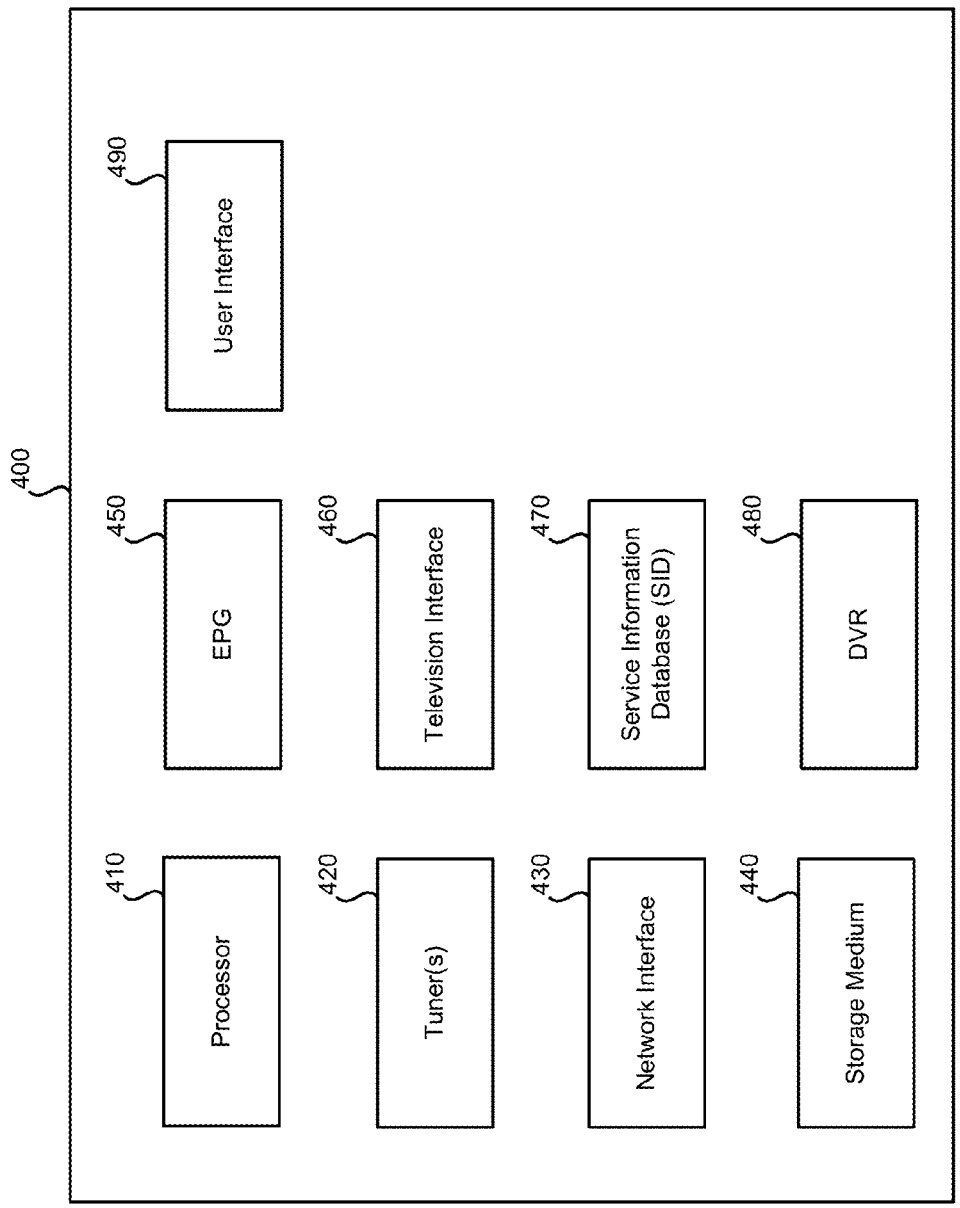
FIG. 4 illustrates a block diagram of an embodiment of a television channel receiving equipment.

In communication with satellite dish 140, may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of set-top box 150. As such, set-top box 150 may decode signals received via satellite dish 140 and provide an output to television 160. FIG. 4 provides additional detail of receiving equipment.

Television 160 may be used to present video and/or audio decoded by set-top box 150. Set-top box 150 may also output a display of one or more interfaces to television 160, such as an electronic programming guide (EPG). In some embodiments, a display device other than a television may be used.

Uplink signal 170-1 represents a signal between satellite uplink 120 and satellite 130-1. Uplink signal 170-2 represents a signal between satellite uplink 120 and satellite 130-3. Each of uplink signals 170 may contain streams of one or more different television channels. For example, uplink signal 170-1 may contain a high-definition instance of a television channel, while uplink signal 170-2 contains a standard-definition television channel containing the same content as the high-definition instance of the television channel. As illustrated in FIG. 1, the signal path between satellite uplink 120 and satellite 130-1 is different than the signal path between satellite uplink 120 and satellite 130-3. As such, it may be possible that one of the uplink signals may be received by its satellite, but not the other. As such, an uplink to one satellite may be functional while an uplink to another satellite may be nonfunctional. For example, weather may block the signal path of uplink signal 170-1, but may not block the signal path of uplink signal 170-2.

Downlink signal 180-1 represents a signal between satellite 130-1 and satellite dish 140. Downlink signal 180-2 represents a signal path between satellite 130-3 and satellite dish 140. Each of downlink signals 180 may contain one or more different television channels. For example, downlink signal 180-1 may contain a high-definition television channel, while downlink signal 180-2 contains a standard-definition television channel providing the same content as the high-definition television channel. As illustrated in FIG. 1, the signal path between satellite 130-1 and satellite dish 140 of downlink signal 180 is different than the signal path between satellite 130-3 and satellite dish 140 of downlink signal 180-2. As such, it may be possible that only one of the downlink signals may be adequately received by satellite dish 140. As such, a downlink from one satellite may be functional while a downlink from another satellite may be nonfunctional.

FIG. 1 illustrates downlink signal 180-1 and downlink signal 180-2 being received by satellite dish 140. For some television channels, satellite dish 140 may receive downlink signal 180-1; for other channels, downlink signal 180-2 may be received. STB 150 may decode the received downlink signal. As such, depending on which television channel is desired, a downlink signal from a different satellite (or a different transponder of the same satellite) may be accessed and transmitted to STB 150. Satellite 130-2 may be another satellite that receives a television channel stream from satellite uplink 120 and relays it to user equipment, such as satellite dish 140. In the embodiment of FIG. 1, satellite 130-2 is not illustrated with either uplink or downlink signals for simplicity only. Further, while three satellites are present in satellite television system 100, in other embodiments greater or fewer numbers of satellites may be present.

Figure 2:
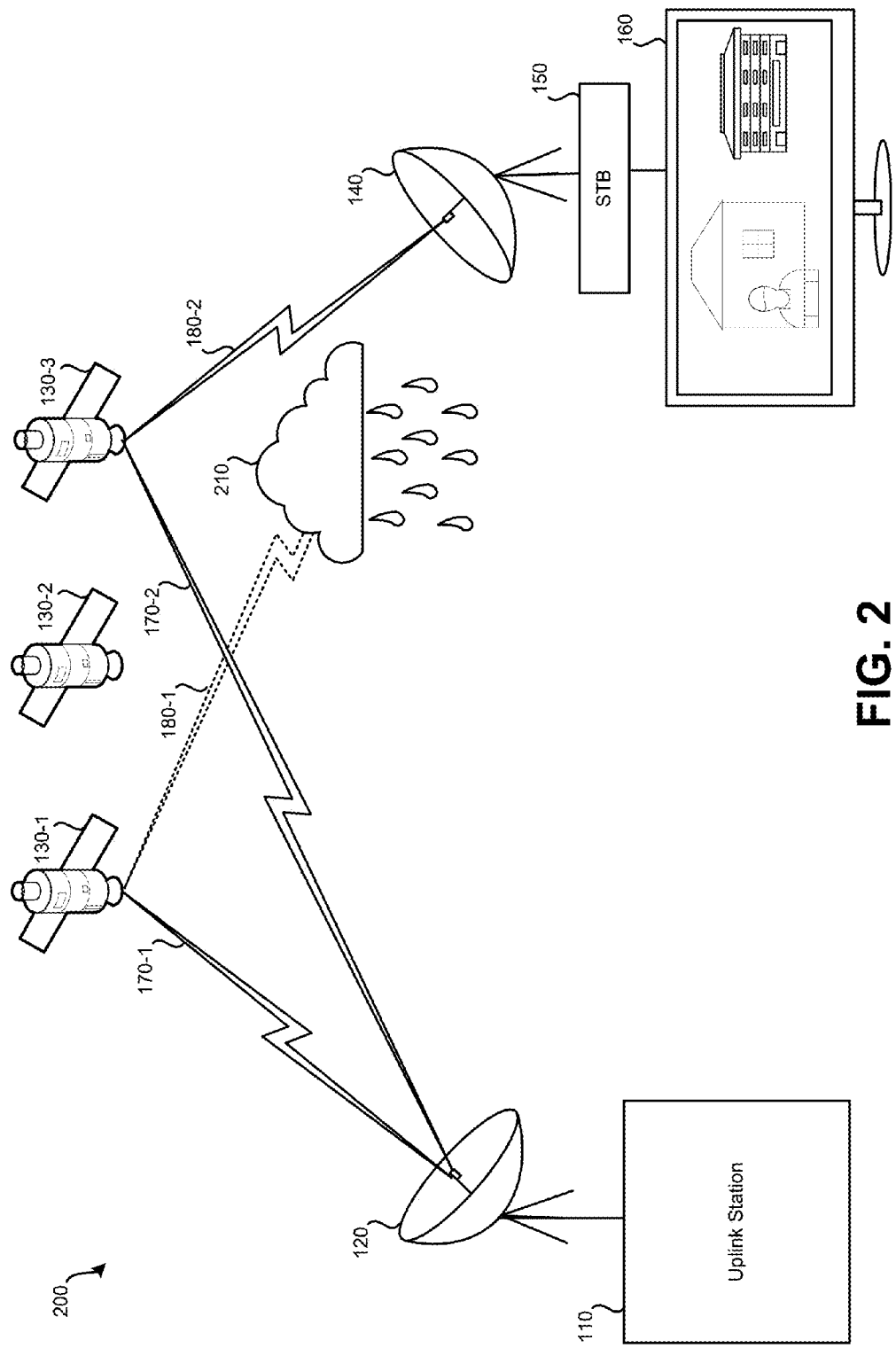
FIG. 2 illustrates an embodiment of a satellite television system wherein weather is interfering with reception of one or more television channels.

FIG. 2 illustrates an embodiment of a satellite television system 200 wherein weather is interfering with reception of one or more television channels. Satellite television system 200 may represent satellite television system 100 of FIG. 1 with the addition of a rainstorm 210 obstructing satellite dish 140 from adequately receiving downlink signal 180-1. In FIG. 2, a rainstorm is used as an example of one type of occurrence that may prevent one or more television channels from being received successfully by user equipment (satellite dish 140, set-top box 150, and/or television 160). Other occurrences that may prevent one or more television channels from being successfully received by user equipment may include: a satellite outage, an outage of one or more particular transponders of a satellite, an outage at uplink station 110, an outage at satellite uplink 120, an uplink signal not being received by the proper satellite of satellites 130, and the television channel not being initially received by uplink station 110.

Due to the current location of rainstorm 210, satellite dish 140 is obstructed from successfully receiving downlink signal 180-1; satellite dish 140 is successfully receiving downlink signal 180-2. As such, television channels transmitted via satellite 130-1 via downlink signal 180-1 may not be successfully received; television channels transmitted via satellite 130-3 via downlink signal 180-2 may be successfully received. Therefore, to a user viewing television 160, one or more channels from satellite 130-1 (or specific transponders of satellite 130-1) may be unavailable; channels from other satellites (or other transponders of satellite 130-1) may remain available. As rainstorm 210 moves, downlink signal 180-1 may again become available; another downlink signal, such as downlink signal 180-2, may become unavailable.

Figure 3:
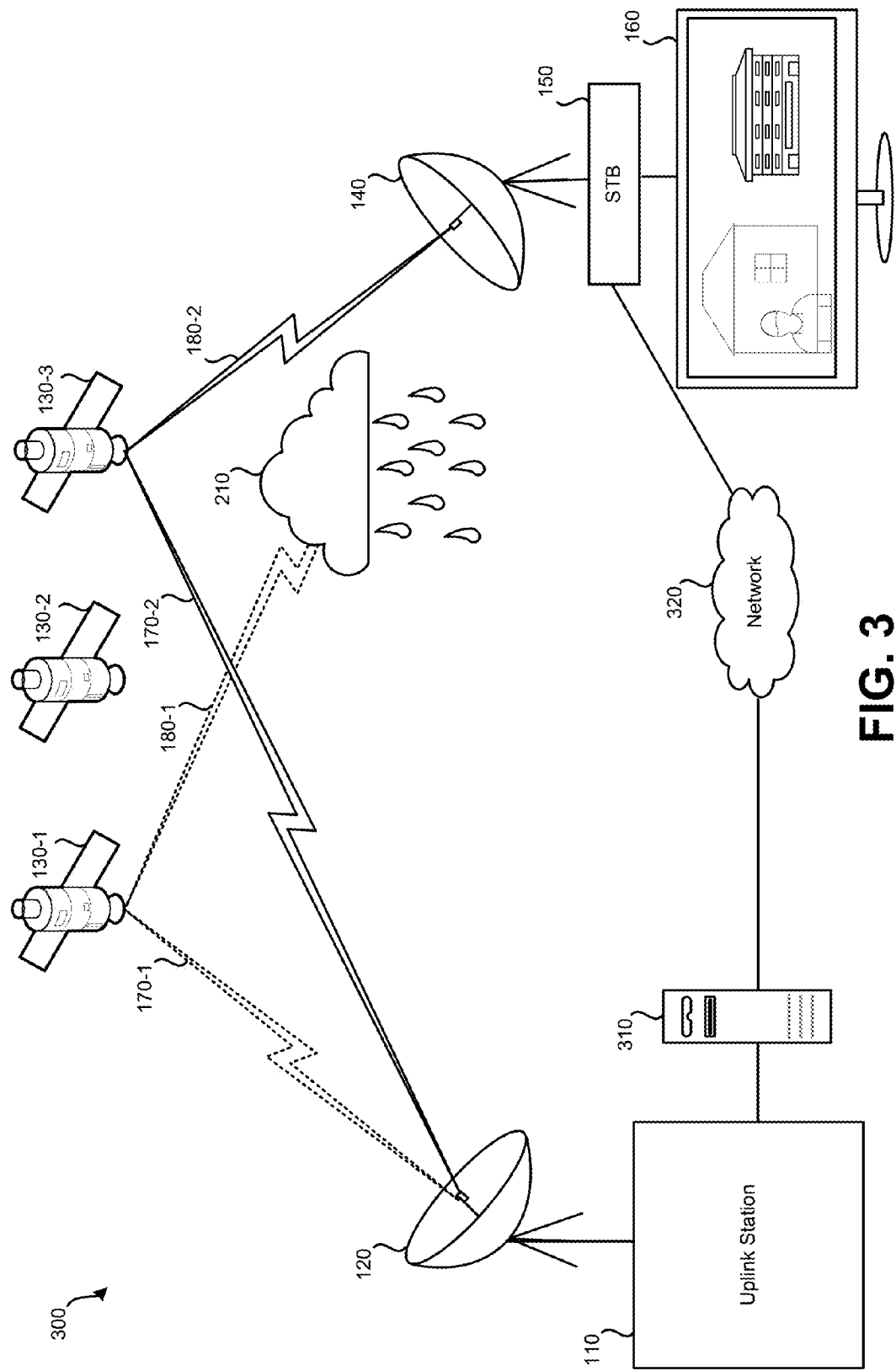
FIG. 3 illustrates an embodiment of a satellite television system having an alternate communication channel wherein weather is interfering with reception of one or more television channels.

FIG. 3 illustrates an embodiment of a satellite television system having an alternate communication channel wherein weather is interfering with reception of one or more television channels. Satellite television system 300, similar to satellite television system 200, may represent satellite television system 100 of FIG. 1 with the addition of a rainstorm 210 obstructing satellite dish 140 from adequately receiving downlink signal 180-1. Satellite television system 300 may also include a television provider server system 310.

Television provider server system 310 may be configured to communicate with set-top box 150 via network 320. Network 320 may represent one or more networks, such as the Internet and/or some other network, such as a home WiFi network. Television provider server system 310 may also be configured to communicate with other components of a television service provider system, such as uplink station 110. As such, it may be possible for television provider server system 310 to receive information from and/or provide information to set-top box 150 and other components of the television service provider system, such as uplink station 110.

If set-top box 150 is unable to successfully receive a television channel, a message may be transmitted to television provider server system 310. Television provider server system 310 may receive such indications from multiple set-top boxes (or, more generally, receiving equipment). Such data may assist a television service provider in identifying television channel outage areas due to weather or some other occurrence. Such data may be used by television provider server system 310 to warn other users, compile statistics, and/or credit users' accounts. For example, user equipment that is known to be in the oncoming path of rainstorm 210 may receive a message that warns of a possible impending service outage. If a more widespread problem occurs, such as a satellite outage, television provider server system 310 may receive messages from receiving equipment indicating channels that are unavailable from a wide-ranging geographic area.

Rather than reception problems by satellite dish 140, if a problem occurs at uplink station 110, satellite uplink 120, or one of satellites 130, television provider server system 310 may be notified by a component of the television service provider's network, such as uplink station 110. Such information may be provided by television provider server system 310 to multiple sets of receiving equipment, such as set-top box 150. Such information may be provided to set-top box 150 as a push (a message sent to set-top box 150 following the problem being detected) or a pull (a message sent to set-top box 150 upon receiving a request from set-top box 150). For example, in the case of a pull, a user may attempt to tune to an unavailable channel. Information, if available, about the unavailable channel may be attempted to be retrieved by set-top box 150 from television provider server system 310. If available, a message may be presented to the user that indicates the source of the problem; for example, a message may be presented via television 160 that says "Channel 027-1 currently unavailable due to a satellite uplink outage; the problem is expected to be resolved within 15 minutes."

While satellite dish 140 provides a first communication channel with a television service provider by receiving television channels and possibly other data from satellites 130, a second communication channel between set-top box 150 and television provider server system 310 allows for data to be transmitted by set-top box 150 to the television service provider and/or data to be transmitted to set-top box 150 (even when communication via one or more of satellites 130 is not possible).

While FIGS. 1-3 focus on the outage of television channels in a satellite television arrangement, similar outages that affect only particular channels may be experienced in other forms of networks, such as a cable television network. Solutions similar to those detailed in the following description and figures may also be used for television provider networks other than satellite television service provider networks.

FIG. 4 illustrates a block diagram of an embodiment of receiving equipment 400. Receiving equipment 400 may be a set-top box, such as set-top box 150 of FIGS. 1-3, or may be part of a television, such as television 160 of FIGS. 1-3. Receiving equipment 400 may include: processor 410, tuner 420, network interface 430, storage medium 440, electronic programming guide (EPG) 450, television interface 460, (service information database) SID 470, digital video recorder (DVR) 480, and/or user interface 490. In other embodiments of receiving equipment 400, fewer or greater numbers of components may be present.

Processor 410 may be a general-purpose processor configured to perform processes such as decoding a video signal from a particular format, such as MPEG, for output and display on a television. Tuner 420 may include one or more tuners used to tune to television channels, such as television channels transmitted via satellite to receiving equipment 400. For instance, one receiving equipment may be used to tune to a channel for display using a television, while another tuner may be used to tune to a television channel for recording and viewing at some other time. Further, a second tuner may be used to check various television channels to determine if they are available or not. For example, if a user tunes to a first television channel that is not available, receiving equipment 400 may tune to a second television channel that is providing the same content. While the first tuner is tuned to this second television channel, the second tuner may be used to at least periodically check the first television channel for availability.

Network interface 430 may be used to communicate via the second communication channel illustrated in FIG. 3. As such, network interface 430 may be configured to communicate via one or more networks, such as the Internet, to communicate with a television provider server system. Information may be transmitted and/or received via network interface 430.

Storage medium 440 may represent a non-transitory computer readable storage medium. Storage medium 440 may include memory and/or a hard drive. Storage medium 440 may be used to store information received from one or more satellites and/or information received via network interface 430. Storage medium 440 may store information related to EPG 450 and/or SID 470.

EPG 450 may store information related to television channels and the timing of programs appearing on such television channels. Information used to populate EPG 450 may be received via network interface 430 and/or via satellites, such as satellites 130 of FIGS. 1-3. For instance, satellites 130 may periodically provide updates to the EPGs of sets of receiving equipment.

Television interface 460 may serve to output a signal to a television in a proper format for display of video and playback of audio.

The service information database (SID) 470 may store information used by the receiving equipment 400 to access various television channels. Information used to populate SID 470 may be received via satellite and/or may be received via network interface 430 from the television service provider. As such, information present in SID 470 may be periodically updated. SID 470 may be locally-stored by receiving equipment 400 using storage medium 440. Information that may be present in SID 470 may include: television channel numbers, a satellite identifier, a frequency identifier, a transponder identifier, and/or variables indicating other television channels carrying the same content. Table 1 provides a simplified example of SID 470 for several television channels. It should be understood that in other embodiments, many more television channels may be represented in SID 470.

TABLE 1

| Channel No. | Satellite | Transponder | Frequency (GHz) | Content Identifier |
|---|---|---|---|---|
| 13 | 1 | 2 | 4.5 | 121 |
| 27 | 2 | 11 | 4.8 | 333 |
| 857 | 3 | 3 | 4.3 | 121 |
| 955 | 3 | 4 | 5.4 | 333 |

It should be understood that the values provided in Table 1 are for example purposes only. Actual values, including how satellites and transponders are identified, may vary. The frequencies used may also vary.

Two television channels carrying the same content may be separately identified within SID 470. For example, television channel numbers 13 and 857 may be high-definition and standard-definition, respectively. These two channels may carry the same content, but are transmitted in different formats (high- and standard-definition). While to the receiving equipment these television channels may use different satellites, transponders, and/or frequencies, to a user these channels represent the same television channel in different formats. A variable, referred to herein as a content identifier, may be present within the SID that identifies channels that present the same content. For example, television channel number 857 and television channel number 13 have the same content identifier. Based on having the same content identifier, receiving equipment 400 may be able to determine that these two channels have the same content. As such, if tuning occurs to one of these two channels, such as 857, and the television channel is unsuccessful, based on the content identifier the other channel, such as 13, may be attempted, possibly without additional user input.

If a television channel does not correspond to another television channel carrying the same content, another channel having the same content identifier may be present. Also, it may be possible for more than two television channels to have the same content identifier.

Digital Video Recorder (DVR) 480 may permit a television channel to be recorded. DVR 480 may be configured by a user to record particular television programs. Whether a user directly tunes to a television channel or DVR 480 tunes to a first television channel, SID 470 may be used to determine a second television channel for tuning (and/or recording to DVR 480) that carries the same content if the first television channel is not available.

User interface 490 may include a remote control that allows a user to interact with receiving equipment 400. User interface 490 may be used to select a television channel for viewing, view EPG 450, and/or program DVR 480.

Figure 5:
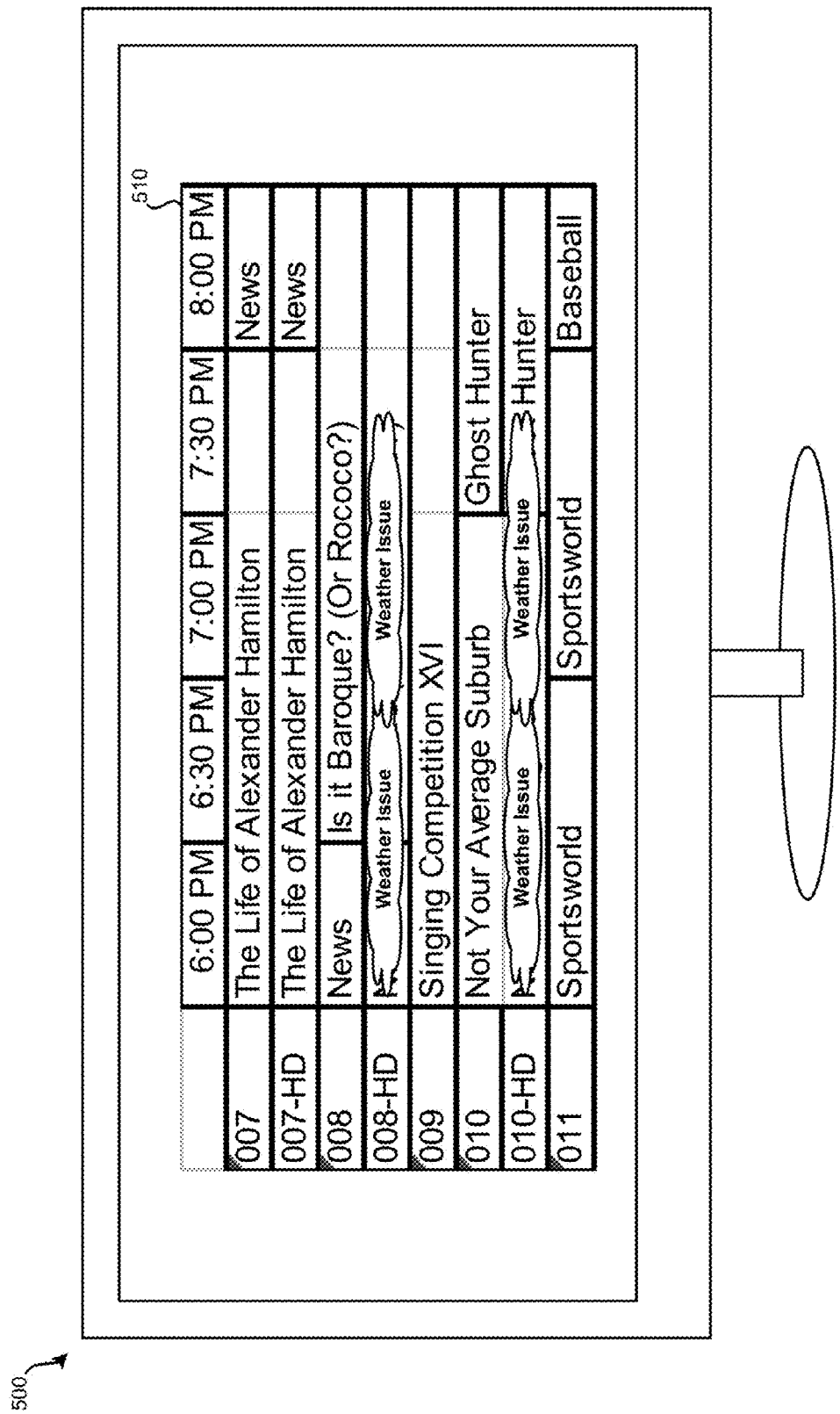
FIG. 5 illustrates an embodiment of an Electronic Programming Guide (EPG) displayed by a television, wherein unavailable television channels are denoted.

FIG. 5 illustrates an embodiment 500 of an Electronic Programming Guide (EPG) 510 displayed by a television, wherein unavailable channels are denoted. The television of embodiment 500 may represent television 160 of FIGS. 1-3. EPG 510 may represent an embodiment of EPG 450 of receiving equipment 400. EPG 510 may be updated to reflect television channels that are currently unavailable, whether due to satellite outage, weather, some other cause of signal loss, uplink issues, etc. EPG 510 may be updated based on locally-gathered information by the receiving equipment providing EPG 510 and/or by information obtained from a remote server, such as television provider server system 310 of FIG. 3.

If the receiving equipment attempts to tune to a television channel and the television channel is unavailable, EPG 510 may be updated to indicate that the television channel is unavailable. If a particular television channel is determined to be unavailable, other television channels that use the same satellite and/or transponder may be assumed to also be unavailable and may be indicated as such on EPG 510.

Information used to update EPG 510 may also be obtained from the television service provider via satellite or an alternate communication path, such as television provider server system 310 of FIG. 3. If the television channel is determined to be unavailable by receiving equipment, television provider server system 310 may be contacted. Information may be retrieved about the status of the unavailable television channel and/or other television channels that may also be unavailable. Using such information, EPG 510 may be updated. Referring to EPG 510, various television channels are indicated as unavailable due to weather (or some other type of technical issue). That the television channels are unavailable due to weather may be based on information retrieved from television provider server system 310 and/or information determined by the receiving equipment. For example, if information received from television provider server system 310 does not indicate an outage of a television channel but the receiving equipment is unable to receive the television channel, it may be assumed that weather is the cause. Another possibility could be an equipment issue at the receiving end, such as a bad low noise block (LNB) which could be detected by the receiving equipment and a different message could be displayed. In some embodiments, television provider server system 310 may provide an indication that weather may be causing issues in the area of the receiving equipment. (For example, based on weather radar and/or information received from other sets of receiving equipment, the television provider server system 310 may be aware of substantial weather occurring in the vicinity of signal path between the receiving equipment and one or more satellites.)

Periodically, the unavailable channels listed on EPG 510 may be checked using a tuner of the receiving equipment to determine if the unavailable channels have become available. In some embodiments, information may be obtained from television provider server system 310 to determine when the television channels are likely available. Once the television channels have become available, EPG 510 may be updated.

In the case of weather, FIG. 5 illustrates channels as being unavailable by placing clouds over the listing of the channel and indicating that weather is the cause. It should be understood this is for example purposes only; other display techniques may be used to indicate to a user the cause of a television channel outage.

If the user attempts to tune to a first television channel that is currently unavailable, using a locally-stored SID having content identifiers, a second television channel carrying the same content as the first television channel selected by the user may be tuned to. An indication may be provided on the television screen that indicates an alternate television channel is being used due to unavailability of the first television channel. For example, an indication may be presented on the television that reads: "The high-definition format version of your selected television channel is not currently available. You have been redirected to the standard-definition version of this television channel."

Figure 6:
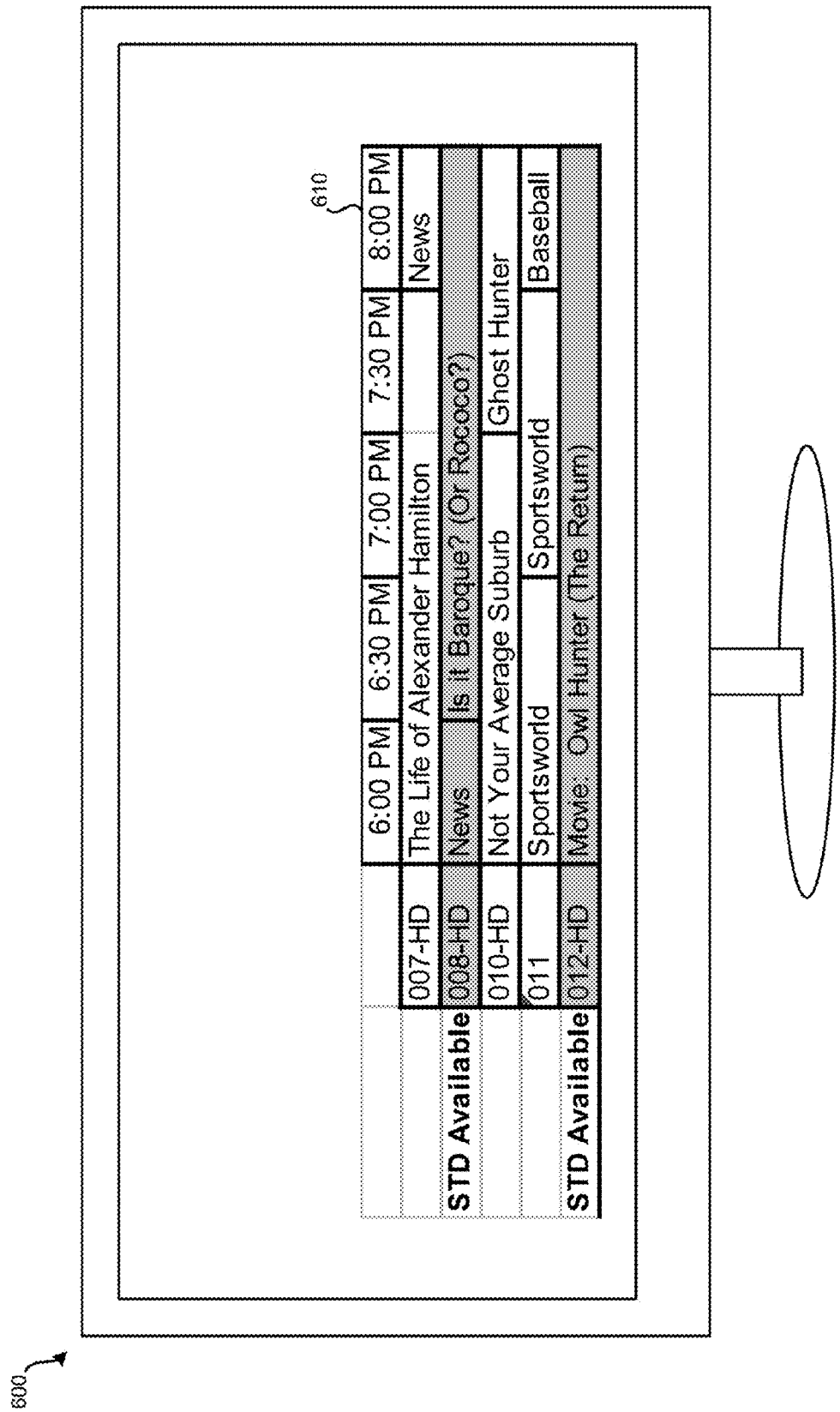
FIG. 6 illustrates another embodiment of an EPG displayed by a television, wherein unavailable television channels are denoted.

FIG. 6 illustrates another embodiment 600 of an EPG 610 displayed by a television, wherein unavailable channels are denoted. The television of embodiment 600 may represent television 160 of FIGS. 1-3. EPG 610 may represent an embodiment of EPG 450 of receiving equipment 400. EPG 610 may be updated to reflect television channels that are currently unavailable, whether due to satellite outage, weather, some other cause of signal loss, uplink issues, etc. EPG 610 may be updated based on locally-gathered information by the receiving equipment providing EPG 610 and/or by information obtained from a remote server, such as television provider server system 310.

If the receiving equipment attempts to tune to a television channel that is unavailable, EPG 610 may be updated to indicate that the television channel is unavailable. If a particular television channel is determined to be unavailable, other television channels that use the same satellite, transponder, and/or frequency may be assumed to also be unavailable and may be indicated as such on EPG 510.

In some embodiments of EPGs, if a television channel is available in high definition, a standard-definition television channel carrying the same content may be hidden from display on the EPG to users. Since a user will almost always prefer a high-definition channel over a standard-definition format of the same television channel, listing the standard-definition version of the television channel may clutter the EPG and serve little use to a user (when under normal operation). As such, standard-definition television channels may not be listed by an EPG if a high-definition version of a television channel (that carries the same content) is available. This may present a problem if a high-definition channel is unavailable, but the standard-definition version of the channel remains available. It may not be readily evident to a user how to tune to the standard-definition version of the television channel because it is not displayed as part of the EPG.

On EPG 610, when a high-definition channel is available that carries the same content as a standard definition television channel, the standard-definition channel is hidden. However, if a user attempts to tune to a television channel that is not currently available, a television channel carrying the same content, such as a standard-definition version of the channel, may be tuned to instead. As depicted in EPG 610, a high-definition channel that is currently unavailable may be grayed out. Additionally or alternatively, an indication may be presented that indicates a standard-definition version of the television channel is available.

The preceding examples have focused on the instance where a high-definition channel is not available but a standard-definition version of the channel is available; it should be understood this is for example purposes only. For example, the reverse situation may also be true: a user may attempt to tune into a standard-definition version of the channel; if not available, the high-definition version of the channel may be tuned to instead.

Referring to EPG 610, if unavailable channel 008-HD is selected by a user (or by a DVR programmed to record) an SID may be accessed to identify a television channel that carries the same content. In embodiment 600, information may be exchanged by the receiving equipment providing EPG 610 with a television provider server system regarding which television channels are currently unavailable, similarly to as detailed in relation to embodiment 500 of FIG. 5.

While embodiment 500 uses clouds to illustrate unavailable television channels, and embodiment 600 grays out unavailable television channels, it should be understood that these embodiments are for example purposes only. In other embodiments, an unavailable television channel may be removed from the EPG for display to a user. In still other embodiments, other visual and/or audio indications may be used to identify unavailable television channels.

Figure 7:
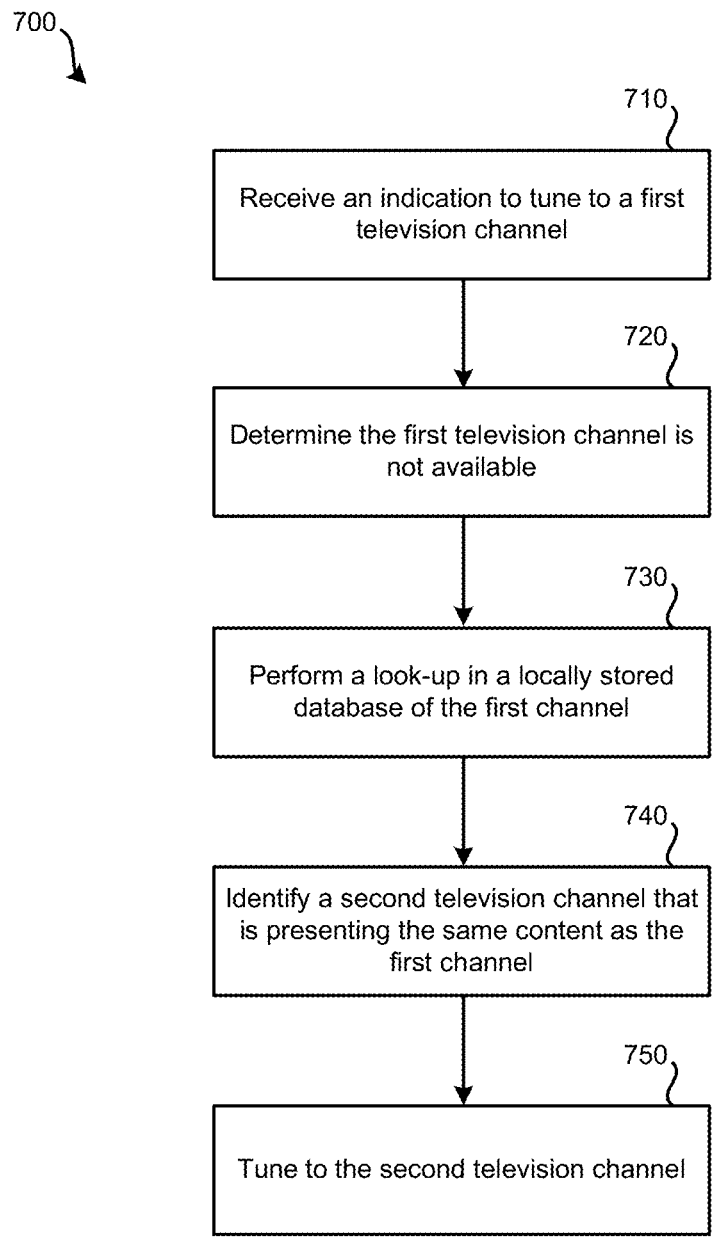
FIG. 7 illustrates an embodiment of a method for television channel tuning.

The systems of FIGS. 1-3, the receiving equipment of FIG. 4, and the EPGs of FIGS. 5 and 6 may be used in performing various methods. FIG. 7 illustrates an embodiment of a method 700 for television channel tuning Method 700 may be performed using the systems of FIGS. 1-3, the receiving equipment of FIG. 4, and/or the EPGs of FIGS. 5 and 6. Method 700 allows for an alternative television channel to be selected that is carrying the same content as an unavailable television channel that was selected for tuning, whether by a user or a DVR. Each step of method 700 may be performed by receiving equipment, such as receiving equipment incorporated as part of a television or a set-top box. Means for performing each step of method 700 include receiving equipment and/or the various components of receiving equipment, such as those detailed in relation to FIG. 4.

At step 710, an indication to tune to a first television channel may be received. The indication to tune to the first television channel may be received from a user (e.g., via a remote control) or from a DVR (e.g., for a scheduled recording event). Such a DVR may have been previously programmed by a user to record a particular television channel for a particular time period.

At step 720, the first television channel may be determined to be unavailable. This may occur if the first television channel is attempted to be tuned to but a sufficient signal is not received. At step 730, a lookup may be performed using a locally-stored database of the first channel that is unavailable. Such a lookup may be performed in an SID, such as that described in relation to FIG. 4. Based on the lookup in the locally-stored database of the first channel, a second television channel may be identified that carries the same content as the first television channel at step 740. For example, the second channel may be a standard-definition version of the first channel, which may be high-definition. As such, the content (e.g., the television program) being presented by each channel may be the same but in different display and/or audio formats. This second television channel may be transmitted from a different satellite or a different transponder of the same satellite.

At step 750, the second television channel may be tuned to. Beyond the selection of the first television channel, no additional user input may be required to tune to the second television channel in place of the first television channel. That is, the user selects the first television channel for tuning, but the receiving equipment tunes to the second television channel without further input from the user. As such, the user may be viewing (or the DVR may be recording) the second television channel in place of the first. This second television channel may be tuned to using a different satellite, a different transponder of the same satellite, and/or a different frequency than the first television channel. Whether or not the second television channel is displayed in an EPG presented to the user may not affect the ability of the receiving equipment to tune to this second television channel. Rather, as long as the second television channel is indicated in the SID, it may be tuned to.

In some embodiments, at steps 730 and 740 it may be determined that rather than tuning to a different transponder or different satellite for the second television channel, the second television channel is available via a packet-based network connection, such with the Internet. As such, rather than receiving the second television channel via a satellite link, the second television channel may be requested and received via an IP connection. In such embodiments, at step 750 the second television channel may be decoded from the received packets and presented without a signal being decoded from a satellite.

Figure 8:
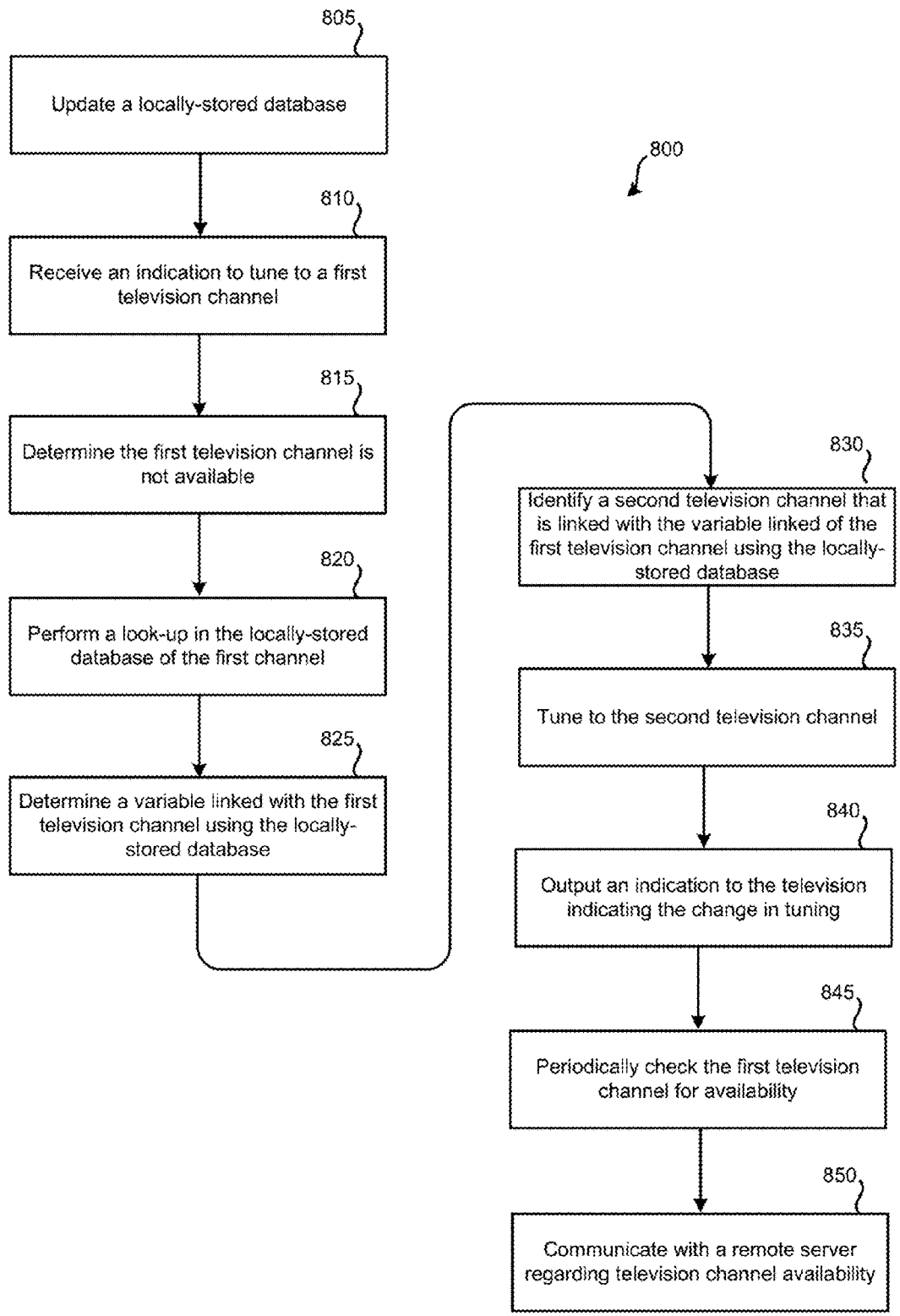
FIG. 8 illustrates another embodiment of a method for television channel tuning.

FIG. 8 illustrates another embodiment of a method for television channel tuning Method 800 may be performed using the systems of FIGS. 1-3, the receiving equipment of FIG. 4, and/or the EPGs of FIGS. 5 and 6. Method 800 allows for an alternative television channel to be tuned to that is carrying the same content as an unavailable television channel that was selected for tuning, whether directed by a user or indirectly via a DVR. Each step of method 800 may be performed by receiving equipment, such as receiving equipment incorporated as part of a television or a set-top box. Means for performing each step of method 800 include receiving equipment and/or the various components of receiving equipment, such as those detailed in relation to FIG. 4. Method 800 may represent a more detailed embodiment of method 700.

At step 805, a locally-stored database may be updated. This database may be periodically updated. The locally-stored database may at least include a service information database (SID), such as SID 470 of FIG. 4. The SID may indicate content identifiers. Content identifiers may indicate which channels carry the same content. Each channel that presents the same content may be linked with the same content identifier. In other embodiments, besides using the same variable, some other arrangement may be used to link multiple channels together that present the same content. In the instance of the satellite television system, updates to an SID may be received by receiving equipment via satellite. Updates to an SID may also be received via another communication channel with a television service provider, such as a network connection with a television provider server system via a home WiFi Network and the Internet, as presented in relation to in FIG. 3.

At step 810, an indication to tune to a first television channel may be received. The indication to tune to the first television channel may be received from a user (e.g., via a remote control) or from a DVR, what may be part of the receiving equipment. Such a DVR may have been previously programmed by a user to record a particular television channel during a particular time period.

At step 815, the first television channel may be determined to be unavailable. This may occur for any number of reasons, such as: a satellite outage, weather interfering with signal reception, etc. If after a predetermined period of time a signal is not received adequately, it may be determined that the television channel is not available. At step 820, a lookup may be performed in a locally-stored database of the first channel that is determined to be unavailable. Such a lookup may be performed in a locally-stored SID, such as that described in relation to FIG. 4. The SID may be stored by the receiving equipment. Further, an EPG may be updated to reflect that the first television channel is unavailable.

At step 825, a variable associated with the first television channel may be identified. Referring to Table 1, this variable may be called a content identifier. Multiple television channels that provide the same content may have the same content identifier. Using the SID, when the first television channel is looked up, an entry may be present providing a content identifier for the first television channel. In other embodiments, some other form of database entry may be used to indicate multiple channels that provide the same content.

At step 830, based on the lookup in the locally-stored database of the variable, possibly referred to as a content identifier, a second television channel may be identified that provides the same content as the first channel. This second television channel may be linked with the same content identifier. For example, the second channel may be a standard-definition version of the first channel, which may be high-definition. As such, the content (e.g., the television program available on the television channel) being presented by each of these two channels may be the same but may be presented in different display and/or audio formats.

At step 835, the second television channel may be tuned to. Beyond the selection of the first television channel, no (additional) user input may be required to tune to the second television channel in place of the first television channel. That is, the user selects the first television channel for tuning, but the receiving equipment tunes to the second television channel without further input from the user. As such, the user may view (or the DVR may record) the second television channel in place of the first. This second television channel may be tuned to using a different satellite, a different transponder of the same satellite, and/or a different frequency than the first television channel. Whether or not the second television channel is displayed in an EPG presented to a user may not affect the ability of the receiving equipment to tune to this second television channel. Rather, since the second television channel may be indicated in the SID, it may be tuned to.

At step 840, an indication may be output to the television (via audio and/or video) to provide an indication to the user (that is either currently viewing the television program or viewing at a later time as a program recorded using a DVR). The indication may indicate to the user that a different channel is being used. An explanation of why the second television channel is being used may also be provided. For example, the indication may state: "Your selected channel is unavailable, the standard-definition version of your selected channel is being presented instead."

At step 845, the first television channel initially selected by the user may be periodically checked for availability. This may occur using a different tuner of the receiving equipment such that recording and/or viewing of the second television channel is not adversely affected. If the first television channel becomes available (possibly for at least a threshold period of time), the first television channel may be tuned to (possibly without user input). In some embodiments, if the first television channel becomes available, an option may be presented to the user that allows the user to specify whether to tune to the first television channel or remain tuned to the second television channel.

At step 850, communication with a remote server, such as television provider server system 310 of FIG. 3, may occur to send and/or receive information regarding unavailable television channels. Such information may be used by receiving equipment to provide a user with status update messages and/or update an EPG. Such information sent to the television provider server system may be used by the television service provider to gather information about television channel outages. Communication with a television provider server system may occur via a second communication channel, such as the Internet, and/or may occur via a satellite communication link.

Figure 9:
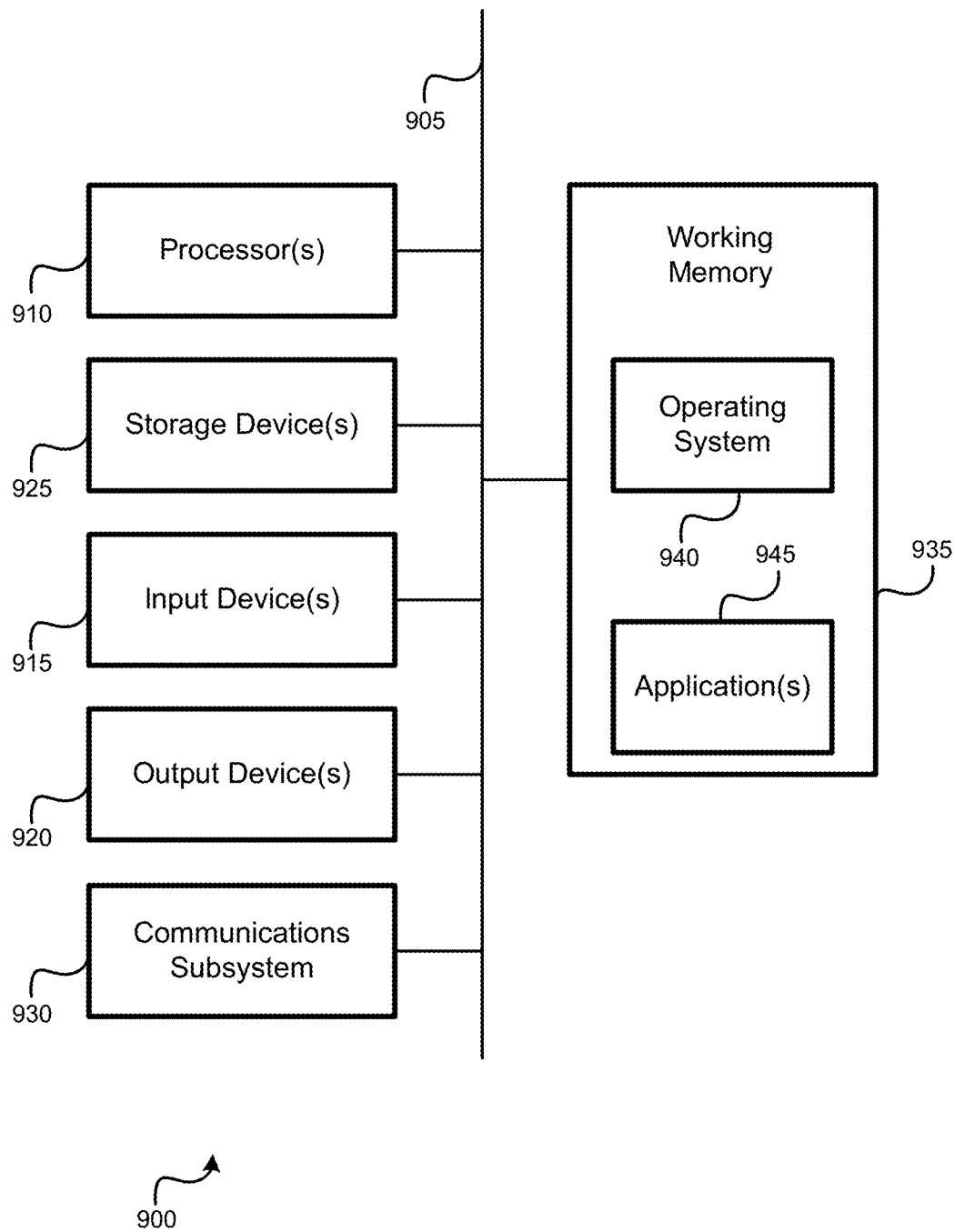
FIG. 9 illustrates an embodiment of a computer system.

FIG. 9 illustrates an embodiment of a computer system. A computer system as illustrated in FIG. 9 may be incorporated as part of the previously-described computerized devices, such as receiving equipment (e.g., set-top box 150 of FIGS. 1-3), and/or television provider server system 310 of FIG. 3. For example, computer system 900 can represent some of the components of the mobile devices and/or the remote computer systems discussed in this application. FIG. 9 provides a schematic illustration of one embodiment of a computer system 900 that can perform the methods provided by various other embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A method for electronic programming guide presentation, the method comprising:
   receiving, by a television receiver, via a tuner of the television receiver, information to populate a locally-stored service information database, wherein the information defines a relationship between transponder stream identifiers and television channels;
   receiving, by a television receiver, an indication of a first television channel for tuning, wherein the first television channel is transmitted as part of a first transponder stream;
   determining, by the television receiver, based on an inadequate downlink signal being received for the first television channel, that the first television channel cannot be received and output;
   identifying, by the television receiver, by performing a look-up in the locally-stored service information database, a plurality of unavailable television channels due to the plurality of unavailable television channels being linked with a same transponder stream identifier as the first television channel as indicated in the locally-stored service information database; and
   outputting, by the receiving receiver to a display device, for presentation an electronic programming guide that indicates the plurality of unavailable television channels and the first television channel are each unavailable.

2. The method for electronic programming guide presentation of claim 1 wherein outputting the electronic programming guide that indicates the plurality of unavailable television channels and the first television channel are unavailable comprises, for each of the plurality of unavailable television channels and the first television channel, outputting for presentation an indication as part of the electronic programming guide that the television channel is unavailable in lieu of presenting an indication of scheduled programming.

3. The method for electronic programming guide presentation of claim 1 wherein outputting the electronic programming guide that indicates the plurality of unavailable television channels and the first television channel are unavailable comprises, for each of the plurality of unavailable television channels and the first television channel, presenting, as part of the electronic programming guide, a graphical representation of a weather event indicative of the television channel being unavailable.

4. The method for electronic programming guide presentation of claim 1 wherein an indication of a corresponding available standard-definition television channel is output in relation to each television channel of the plurality of unavailable television channels as part of the electronic programming guide.

5. The method for electronic programming guide presentation of claim 1, further comprising:
   receiving, by the television receiver, via the Internet, an indication of one or more television channels currently unavailable; and
   outputting, by the television receiver, for presentation to the display device, the electronic programming guide that indicates the one or more television channels are each unavailable.

6. The method for electronic programming guide presentation of claim 4, further comprising:
   in response to determining the first television channel cannot be received, tuning, by the television receiver, to a second television channel that is a standard definition version of the first television channel, the first television channel being a high definition television channel.

7. The method for electronic programming guide presentation of claim 6, wherein the first television channel and the second television channel are transmitted on different transponder streams.

8. The method for electronic programming guide presentation of claim 6, wherein the first television channel is transmitted from a different location than the second television channel.

9. The method for electronic programming guide presentation of claim 6, further comprising:
   following tuning to the second television channel, monitoring, by the television receiver, the first television channel to determine when the first television channel has become available; and
   following the first television channel being determined to be available, tuning, by the television receiver, to the first television channel.

10. A television receiver, comprising:
    a tuner;
    one or more processors; and
    a memory communicatively coupled with and readable by the one or more processors and having stored therein processor-readable instructions which, when executed by the one or more processors, cause the one or more processors to:
       receive, via the tuner of the television receiver, information to populate a locally-stored service information database, wherein the information defines a relationship between transponder stream identifiers and television channels;
       receive an indication of a first television channel for tuning, wherein the first television channel is transmitted as part of a first transponder stream;
       determine, based on an inadequate downlink signal being received for the first television channel, that the first television channel cannot be received and output;
       identify, by performing a look-up in the locally-stored service information database, a plurality of unavailable television channels due to the plurality of unavailable television channels being linked with a same transponder stream identifier as the first television channel as indicated in the locally-stored service information database;
       output for presentation an electronic programming guide that indicates the plurality of unavailable television channels and the first television channel are unavailable.

11. The television receiver of claim 10 wherein the processor-readable instructions that, when executed, cause the one or more processors to output for presentation the electronic programming guide that indicates the plurality of unavailable television channels and the first television channel are unavailable comprise processor-readable instructions which, when executed, cause the one or more processors to, for each of the plurality of unavailable television channels and the first television channel, output for presentation an indication that the television channel is unavailable in lieu of presenting an indication of upcoming scheduled programming.

12. The television receiver of claim 10 wherein the processor-readable instructions that, when executed, cause the one or more processors to output for presentation the electronic programming guide that indicates the plurality of unavailable television channels and the first television channel are unavailable comprise processor-readable instructions which, when executed, cause the one or more processors to, for each of the plurality of unavailable television channels and the first television channel, output for presentation a graphical representation of a weather event indicative of the television channel being unavailable.

13. The television receiver of claim 10 wherein the processor-readable instructions that, when executed, cause the one or more processors to output for presentation the electronic programming guide that indicates the plurality of unavailable television channels are unavailable comprise processor-readable instructions which, when executed, cause the one or more processors to, for each of the plurality of unavailable television channels, output an indication of a corresponding available standard-definition television channel as part of the electronic programming guide.

14. The television receiver of claim 10, wherein the processor-readable instructions, when executed, further cause the one or more processors to:
   receive, via the Internet, an indication of one or more television channels currently unavailable; and
   output for presentation, as part of the electronic programming guide, indications that the one or more television channels are currently unavailable.

15. The television receiver of claim 13, wherein the processor-readable instructions, when executed, further cause the one or more processors to:
   in response to determining the first television channel cannot be received and output, tune the tuner to a second television channel that is a standard definition version of the first television channel, the first television channel being a high definition television channel.

16. The television receiver of claim 15, wherein the processor-readable instructions, when executed, further cause the one or more processors to: receive, via the tuner, the second television channel as part of a different transponder stream than on which the first television channel is transmitted.

17. The television receiver of claim 15, wherein the processor-readable instructions, when executed, further cause the one or more processors to:
   following tuning the tuner to the second television channel, monitor the first television channel to determine when the first television channel has become available; and
   following the first television channel being determined to be available, outputting the first television channel for presentation.

18. A non-transitory processor-readable medium, comprising processor-readable instructions configured to cause one or more processors to:
   receive information to populate a locally-stored service information database, wherein the information defines a relationship between transponder stream identifiers and television channels;
   receive an indication of a first television channel for tuning, wherein the first television channel is transmitted as part of a first transponder stream;
   determine, based on an inadequate downlink signal being received for the first television channel, that the first television channel cannot be received and output;
   identify, by performing a look-up in the locally-stored service information database, a plurality of unavailable television channels due to the plurality of unavailable television channels being linked with a same transponder stream identifier as the first television channel as indicated in the locally-stored service information database; and
   cause an electronic programming guide that indicates the plurality of unavailable television channels and the first television channel are unavailable to be output for presentation.

19. The non-transitory processor-readable medium of claim 18, wherein the processor-readable instructions configured to cause the one or more processors to output for presentation the electronic programming guide that indicates the plurality of unavailable television channels and the first television channel are unavailable comprise processor-readable instructions configured to cause the one or more processors to:
   for each of the plurality of unavailable television channels and the first television channel, cause an indication that the television channel is unavailable in lieu of presenting an indication of scheduled programming to be output for presentation.

20. The non-transitory processor-readable medium of claim 18, wherein the processor-readable instructions configured to cause the one or more processors to output for presentation the electronic programming guide that indicates the plurality of unavailable television channels and the first television channel are unavailable comprise processor-readable instructions configured to cause the one or more processors to:
   for each of the plurality of unavailable television channels and the first television channel, cause a graphical representation of a weather event indicative of the television channel being unavailable to be output for presentation.

* * * * *